(12) United States Patent
Yoo et al.

(10) Patent No.: US 8,133,650 B2
(45) Date of Patent: Mar. 13, 2012

(54) POLYESTER RESIN AND TONER INCLUDING THE SAME

(75) Inventors: Young-Man Yoo, Gyeonggi-do (KR); Jae-Kyoung Roh, Gyeonggi-do (KR); Kye-Yune Lee, Gyeonggi-do (KR); Tae-Woong Lee, Gyeonggi-do (KR)

(73) Assignee: SK Chemicals Co., Ltd. (KR)

( * ) Notice: Subject to any disclaimer, the term of this patent is extended or adjusted under 35 U.S.C. 154(b) by 71 days.

(21) Appl. No.: 12/743,543

(22) PCT Filed: Jul. 10, 2008

(86) PCT No.: PCT/KR2008/004068
§ 371 (c)(1),
(2), (4) Date: May 18, 2010

(87) PCT Pub. No.: WO2009/066850
PCT Pub. Date: May 28, 2009

(65) Prior Publication Data
US 2010/0261867 A1    Oct. 14, 2010

(30) Foreign Application Priority Data
Nov. 21, 2007    (KR) .................. 10-2007-0119229

(51) Int. Cl.
*C08G 63/00*    (2006.01)
*C08G 63/02*    (2006.01)

(52) U.S. Cl. .................. 430/190; 430/108.1; 430/108.4; 430/109.1; 430/109.4; 528/176; 528/191; 528/192; 528/193; 528/271.1; 528/272

(58) Field of Classification Search ............... 430/108.1, 430/108.4, 109.1, 109.4; 528/176, 190, 191, 528/192, 193, 271, 272
See application file for complete search history.

(56) References Cited

U.S. PATENT DOCUMENTS
7,226,984 B2    6/2007    Iwata

FOREIGN PATENT DOCUMENTS

| JP | H11-305485 | 11/1999 |
|---|---|---|
| JP | 2004-126544 | 4/2004 |
| JP | 2006-106272 | 4/2006 |
| KR | 2004-0010752 | 1/2004 |
| KR | 10-2005-0051543 | 6/2005 |
| KR | 10-2006-0018129 | 2/2006 |
| KR | 10-0666408 | 1/2007 |
| KR | 10-0715263 | 4/2007 |

*Primary Examiner* — Terressa Boykin
(74) *Attorney, Agent, or Firm* — Blakely, Sokoloff, Taylor & Zafman

(57) ABSTRACT

A polyester resin which includes acid components having aromatic dibasic acid component and trivalent or higher acid component; alcohol components including aliphatic, aromatic or cycloaliphatic diol component, and trihydric or higher alcohol component; polyolefin polyol having 1,800 to 2,500 number average molecular weight and hydroxyl value of 40 to 55 KOHmg/g; and wax having melting point of 80 to 110, wherein the amount of the polyolefin polyol is 0.1 to 2 weight % and the amount of the wax is 0.5 to 15 weight % with respect to the total polyester resin. Also disclosed is a method for preparing polyester resin by (a) carrying out an esterification reaction or an ester exchange reaction with the acid components, the alcohol components, and the polyolefin polyol; and (b) carrying out a polycondensation reaction for reaction product of the esterification or ester exchange reaction in the presence of the wax.

6 Claims, No Drawings

POLYESTER RESIN AND TONER INCLUDING THE SAME

This is a non-provisional application claiming the benefit of International application number PCT/KR2008/004068 filed Jul. 10, 2008.

TECHNICAL FIELD

This application claims the priority benefit of Korean Patent Application No. 10-2007-119229 filed on Nov. 21, 2007, the entire contents of which are incorporated herein by reference. This invention relates to a polyester resin and a toner including the same, and more particularly, to a toner for an electrophotographic image forming process or an electrostatic printing process, and a polyester resin, which is included in the toner as a binder and includes polyolefin polyol and wax of a low melting point.

BACKGROUND ART

Generally, an electrophotographic image forming process or an electrostatic printing process includes the steps of (1) forming an electro-conductive image (i.e., a latent image) or an electrostatically charged image corresponding to a recorded image on the surface of an electrostatic recording medium, for example, an OPC (Organic Photo-conductor) drum, (2) developing the latent image with a charged toner, (3) transferring the developed toner image onto a recording material, such as a paper or a recordable film, and (4) fixing the transferred image on the recording material with a heat-compressing roller. The image-forming process such as the electrophotographic image forming process or the electrostatic printing process has advantages in that a printed or copied matter can be obtained with a high speed, the image formed on a recording material is stable, and an image-forming device is easy to manipulate. Therefore, the image-forming process has been widely used in the fields of copiers and printers.

The toner for the developing process can be classified into a one-component toner, a two-component toner, etc. The two-component toner includes a binder resin, a coloring agent, an electrification control agent, various additives, and magnetic substances for developing the latent image formed on a drum and transferring the developed image. In general, the toner is produced in the form of particles by melting, kneading, and dispersing the toner components, and then finely pulverizing and classifying the kneaded components. The binder resin, which is one of the main components of the toner composition, should have desirable properties in dispersing the coloring agent, and in a fixing property, an offset-preventing property, a storage-stability, and an electrical property. The binder resin also should have a good transparency, and produce a clear image even when a small amount of the coloring agent is used. Further preferably, the binder resin should have a wide color expression range, improve the image density of a copied or printed image, and be environmentally desirable.

As the binder resin, polystyrene resin, styrene-acrylic resin, epoxy resin, and polyamide resin have been conventionally used. Recently, a polyester resin is more commonly used as the binder resin due to its superior fixing property, good transparency, and so on. Also, a wax is generally added to the toner to improve offset-preventing property of the toner. However, the compatibility of the wax and the polyester resin is not good, and the wax can not be uniformly mixed with the polyester resin in the toner. To resolve this problem, Korean Patent Laid Open No. 10-2004-0010752 discloses a polyester resin polymerized in the presence of Carnauba wax consisting of aliphatic ester, aliphatic acid and alcohol. However, in this case, the wax can be deteriorated, carbonized or heat-degraded during the polymerization reaction of the resin, and the odor of the wax can induce bad effects during the polymerization of the resin, the production of the toner or a printing process. Also, Korean Patent Laid Open No. 10-2005-0085116 discloses a resin to which a wax having substituent groups was dispersed, and a polyester resin reacted with a wax having substituent groups. However, in this case, the dispersibility of wax is not satisfactory, or the reacted wax does not fully perform its releasing effect during the toner fixing process. Also, in U.S. Pat. No. 7,226,984, the fixing property of a toner is improved by introducing carboxyl-modified polyolefin or hydroxyl-terminated polyalkadiene into the structure of the polyester resin.

Meanwhile, in preparing a polyester resin for toner, a catalyst such as germanium based catalyst, antimony based catalyst, and tin based catalyst and so on has been used. However, because the catalyst should be used in large amount due to a low catalytic activity of the catalyst, the catalyst is not desirable in an environmental aspect. The conventional catalyst deteriorates the transparency of a polyester resin due to its characteristic coloring property (for example, the antimony based catalyst has a gray coloring property). Therefore, titanium based catalyst is tried to improve the catalytic activity and the transparency of a polyester resin, and the titanium based catalyst includes tetraethyl titanate, acetyltripropyl titanate, tetrapropyl titanate, tetrabutyl titanate, polybutyl titanate, ethylacetoaceticester titanate, isostearyl titanate, titanium dioxide, $TiO_2/SiO_2$ co-precipitates, $TiO_2/ZrO_2$ co-precipitates, and so on.

DISCLOSURE OF INVENTION

Technical Problem

Therefore, it is an object of the present invention to provide a polyester resin which has desirable compatibility with wax, and toner including the same.

It is another object of the present invention to provide a toner, which has desirable characteristics in storage stability, fixing temperature range and image density, and in which wax can be uniformly dispersed.

Technical Solution

In order to achieve these objects, the present invention provides a polyester resin comprising: acid components including aromatic dibasic acid component and trivalent or higher acid component; alcohol components including aliphatic, aromatic or cycloaliphatic diol component, and trihydric or higher alcohol component; polyolefin polyol having number average molecular weight of 1,800 to 2,500 and hydroxyl value of 40 to 55 KOHmg/g; and wax having melting point of 80 to 110° C., wherein the amount of the polyolefin polyol is 0.1 to 2 weight % and the amount of the wax is 0.5 to 15 weight % with respect to the total polyester resin.

The present invention also provides a method for preparing polyester resin comprising the steps of: (a) carrying out an esterification reaction or an ester exchange reaction with the acid components, the alcohol components, and the polyolefin polyol; and (b) carrying out a polycondensation reaction for reaction product of the esterification or ester exchange reaction in the presence of the wax.

Advantageous Effects

The polyester resin according to the present invention includes polyolefin polyol which has a low molecular weight and works as a wax compatibilizer as alcohol component, and wax having a low melting point is dispersed into the resin during the resin polymerization. Thus, the polyester resin according to the present invention has desirable compatibility with wax. The toner produced with the polyester resin has desirable characteristics in storage stability, fixing temperature range and image density, and wax can be uniformly dispersed in the toner.

MODE FOR THE INVENTION

A more complete appreciation of the invention, and many of the attendant advantages thereof, will be better appreciated by reference to the following detailed description.

The polyester resin according to the present invention comprises acid components and alcohol components. The acid components include aromatic dibasic acid component and trivalent or higher acid, and if necessary, may further include cycloaliphatic dibasic acid component and aliphatic dibasic acid component. The aromatic dibasic acid component comprises aromatic dibasic acid, alkyl (for example, methyl, ethyl, propyl, and so on) ester thereof, and acid anhydride thereof, which are conventionally used in preparation of a polyester resin. Examples of the aromatic dibasic acid include terephthalic acid, isophthalic acid, 5-sulfoisophthalic acid sodium salt, phthalic acid, and so on. Examples of the alkyl ester of the aromatic dibasic acid include dimethyl terephthalate, dimethyl isophthalate, diethyl terephthalate, diethyl isophthalate, dibutyl terephthalate, dibutyl isophthalate, dimethyl 5-sulfoisophthalate sodium salt, and so on. The aromatic dibasic acid and alkyl ester thereof may be used independently or in combination. The aromatic dibasic acid has a benzene ring having hydrophobic property, and thereby can improve moisture-proof property of a toner and increase a glass transition temperature (hereinafter, Tg) of the produced resin, which results in an improved storage stability of the toner.

In cycloaliphatic dibasic acid component used in the present invention, the cycloaliphatic group has preferably 5 to 20 carbon atoms. Examples of the cycloaliphatic dibasic acid component include 1,2-cyclohexane dicarboxylic acid, 1,3-cyclohexane dicarboxylic acid, 1,4-cyclohexane dicarboxylic acid, alkyl (for example, methyl, ethyl, propyl, and so on) ester thereof, and acid anhydride thereof, which may be used independently or in combination. Also, one or more hydrogen of the cyclic ring of the cycloaliphatic group can be substituted with an alkyl group etc. The cycloaliphatic dibasic acid component decreases melt viscosity of the polyester resin at low temperature of below 130° C. and increases the melt viscosity of the polyester resin at high temperature of above 170° C., and accordingly the toner has a wide fixing range. Also, since the cycloaliphatic dibasic acid component has a lipophilic property, the toner has a good moisture-proof property, and accordingly, has a good image density. Also, the cyclic ring structure of the cycloaliphatic group improves an anti-hydrolysis property and a heat stability of the resin, and accordingly prevents the decrease of the molecular weight when preparing a toner. Thus, the toner has a good fixing property at wide temperature range.

Examples of the trivalent or higher acid component include polycarboxylic acids, such as trimellitic acid, pyromellitic acid, 1,2,4-cyclohexane tricarboxylic acid, 2,5,7-naphthalene tricarboxylic acid, 1,2,4-naphthalene tricarboxylic acid, 1,2,5-hexane tricarboxylic acid, 1,2,7,8-octane tetracarboxylic acid, alkyl ester thereof, and acid anhydride thereof. The trivalent or higher carboxylic acid component may be used independently or in combination. The trivalent or higher carboxylic acid component increases a Tg of the produced resin and enhances cohesion property of the resin, and accordingly the toner has an improved offset preventing property.

If necessary, the acid components for the polyester resin according to the present invention further include aliphatic dibasic acid, alkyl ester thereof and/or acid anhydride thereof. The aliphatic dibasic acid has a linear or branched structure of 2 to 20 carbon atoms, and examples of the aliphatic dibasic acid component include phthalic acid, sebacic acid, isodecyl succinic acid, maleic acid, fumaric acid, adipic acid, azelaic acid, and so on, and alkyl ester thereof such as monomethyl ester thereof, monoethyl ester thereof, and dimethyl or diethyl ester thereof, and acid anhydride thereof.

The alcohol components for the polyester resin according to the present invention include diol components including aliphatic diol, aromatic diol or cycloaliphatic diol, and trihydric or higher alcohol component. Examples of aliphatic diol include a linear or branched aliphatic diol of 2 to 10 carbon atoms, such as 1,2-propanediol (1,2-propylene glycol), ethylene glycol, diethylene glycol, neopentyl glycol, 1,4-butane diol, and so on. Examples of the cycloaliphatic diol component include 1,4-cyclohexane diol, 1,4-cyclohexane dimethanol, spirogylcol, hydrogenated bisphenol A, ethyleneoxide additive of hydrogenated bisphenol A, propyleneoxide additive of hydrogenated bisphenol A, and so on. The cycloaliphatic diol component has preferably 5 to 20 carbon atoms in the cycloaliphatic group thereof.

Examples of the trihydric or higher alcohol include sorbitol, 1,2,3,6-hexanetetrol, 1,4-sorbitan, pentaerythritol, dipentaerythritol, tripentaerythritol, sucrose, 1,2,4-butanetriol, 1,2,5-pentanetriol, glycerol, 2-methylpropanetriol, 2-methyl-1,2,4-butanetriol, trimethylolethane, trimethylolpropane, 1,3,5-trihydroxymethylbenzene, and so on. The trihydric or higher alcohol may be used independently or in combination. The trihydric or higher alcohol component increases a Tg of the resin, and enhances cohesion property of the resin, and accordingly, the toner has an improved storage stability.

The aromatic diol, one of the alcohol components for the polyester resin of the present invention, increases the Tg of the resin, improves the storage stability and the low and/or high temperature fixing property of the toner. The preferable examples of the aromatic diol include bisphenol A derivative, for example, polyoxyethylene-(2.0)-2,2-bis(4-hydroxyphenyl)propane, polyoxypropylene-(2.0)-2,2-bis(4-hydroxyphenyl)propane, polyoxypropylene-(2.2)-polyoxyethylene-(2.0)-2,2-bis(4-hydroxyphenyl)propane, polyoxyethylene-(2.3)-2,2-bis(4-hydroxyphenyl)propane, polyoxypropylene-(6)-2,2-bis(4-hydroxyphenyl)propane, polyoxypropylene-(2.3)-2,2-bis(4-hydroxyphenyl)propane, polyoxypropylene-(2.4)-2,2-bis(4-hydroxyphenyl)propane, polyoxypropylene-(3.3)-2,2-bis(4-hydroxyphenyl)propane, polyoxyethylene-(3.0)-2,2-bis(4-hydroxyphenyl)propane, polyoxyethylene-(6)-2,2-bis(4-hydroxyphenyl)propane, and so on. The aromatic diols can be used alone or in combination. In more than 85 weight % of the bisphenol A derivative aromatic diol, It is preferable that the mole number of ethylene oxide and/or propylene oxide added to the bisphenol A derivative is 2. In less than 0.2 weight % of the bisphenol A derivative aromatic diol, It is preferable that the mole number of ethylene oxide and/or propylene oxide added to the bisphenol A derivative is 1.

In the polyester resin according to the present invention, the amounts of the acid components and the alcohol components can be appropriately controlled according to the required properties of the binder resin. Particularly, with respect to the total acid components, the amount of the aromatic dibasic acid component is 60 to 99.5 mol %, and preferably 80 to 97.5 mol %, and the amount of the trivalent or higher acid component is 0.5 to 20 mol %, and preferably 1 to 10 mol %. When the cycloaliphatic dibasic acid component is used as the acid component for the polyester resin, the amount of the cycloaliphatic dibasic acid component is 0 to 20 mol % and preferably 1 to 10 mol % with respect to the total acid components. When the aliphatic dibasic acid component is used as the acid component for the polyester resin, the amount of the aliphatic dibasic acid is 1 to 10 mol % with respect to the total acid components.

In addition, with respect to the total alcohol components except polyolefin polyol, the amount of the aliphatic, aromatic, or cycloaliphatic diol component is 80 to 99 mol %, and the amount of the trihydric or higher alcohol component is 1 to 20 mol %. Preferably, with respect to the total alcohol components except the polyolefin polyol, the amount of the aliphatic diol is 0 to 99 mol %, more preferably 9 to 97 mol %, and the amount of the aromatic diol is 0 to 90 mol %, more preferably 1 to 80 mol %, and the amount of the cycloaliphatic diol is 0 to 50 mol %, more preferably 1 to 30 mol %. When the amounts of the acid components and alcohol components are not within the ranges, the produced polyester resin may not have the required proprieties as the binder for a toner.

The polyester resin of the present invention further comprises polyolefin polyol in the structure thereof, as a wax compatibilizer to improve the dispersibility of wax. Preferably, the number average molecular weight of the polyolefin polyol is 1,800 to 2,500, and the hydroxyl value of the polyolefin polyol is 40 to 55 KOHmg/g. More preferably, the polyolefin polyol can be hydrogenated polybutadiene polyol. The amount of the polyolefin polyol of the low molecular weight is 0.1 to 2.0 weight %, and preferably 0.3 to 1.0 weight % with respect to the total polyester resin including the wax component. When the amount of the polyolefin polyol is less than the above-mentioned range or the number average molecular weight thereof is less than the above-mentioned range, it is difficult to improve the dispersibility of the wax. On the other hand, when the amount of the polyolefin polyol is more than the above-mentioned range or the number average molecular weight thereof is more than the above-mentioned range, Tg of the resin may decrease, and accordingly, the storage stability and the pulverizing property of the toner may be deteriorated. When the hydroxyl value (KOHmg/g) of the polyolefin polyol is less than the above-mentioned range, the molecular weight of the polyolefin polyol may excessively increase. On the other hand, when the hydroxyl value is more than the above-mentioned range, the molecular weight of the polyolefin polyol may excessively decrease.

The polyester resin of the present invention further comprises wax in the resin to improve the fixing property and the offset preventing property of the toner. The amount of the wax is preferably 0.5 to 15 weight % with respect to the total polyester resin including the wax. When the amount of the wax is less than the above-mentioned range, the low temperature fixing property and the offset preventing property of the toner may be degraded. On the other hand, when the amount of the wax is more than the above-mentioned range, the wax may not be properly dispersed in the resin, and accordingly, it is difficult to obtain desirable toner image. The melting point (temperature) of the wax should be low, and specifically, is within 80 to 110° C. When the melting temperature is less than 80° C., the dispersibility of the wax may be undesirable, and when the melting temperature is more than 110° C., the fixing property and the offset preventing property of the toner can not be sufficiently improved. In the polyester resin, the wax is preferably dispersed to have the diameter of equal to or less than 2 μm, and more preferably, equal to or less than 1 μm. For example, the diameter of the wax component can be 0.01 to 1 μm. When the diameter of the dispersed wax component is more than 2 μm, the electrification property and the storage stability of the toner may be graded, and accordingly, it is difficult to obtain a good toner image. The wax having the melting point of 80 to 110° C. can be used in the present invention without limitation. The wax can be synthetic wax and/or natural wax. Examples of the synthetic wax include polyolefin wax such as polyethylene wax and polypropylene wax. Examples of the natural wax include carnauba wax, montan type ester wax, bees wax and/or rice wax, and so on.

The polyester resin according to the present invention can be prepared by the conventional two step process of (a) an esterification or ester exchange reaction and (b) a polycondensation reaction while mixing wax component. To produce the polyester resin of the present invention, firstly, the acid components and the alcohol components including the polyolefin polyol may be charged in a reactor and heated to perform the esterification or ester exchange reaction. It is preferable that the mole ratio of the total alcohol components (G) with respect to the total acid components (A) is 1.05 to 2.0. When the mole ratio (G/A) is less than 1.05, the unreacted acid components may remain in the polymerization reaction, and accordingly, which deteriorates the transparency of the resin. When the mole ratio (G/A) is more than 2.0, the polymerization process is carried out too slowly, and accordingly, the productivity of the resin may decrease.

The esterification or ester exchange reaction can be carried out in the presence of a conventional titanium based catalyst, such as, tetraethyl titanate, acethyl tripropyl titanate, tetrapropyl titanate, tetrabutyl titanate, polybutyl titanate, ethyl acetoacetic ester titanate, isostearyl titanate, titanium dioxide, $TiO_2/SiO_2$ co-precipitate, $TiO_2/ZrO_2$ co-precipitate, and so on. As the catalyst, it is not preferable to use a heavy metal (for example, antimony, tin) based catalyst in considering the environmental aspect. If necessary, a conventional stabilizer can be used. The esterification or ester exchange reaction may be carried out, for example, under the nitrogen flow atmosphere at the temperature of 230 to 260° C. while removing water or alcohol produced from the reactants by a conventional method.

After the esterification or ester exchange reaction, the polycondensation reaction is carried out for the reaction product of the esterification or ester exchange reaction. The polycondensation reaction can also be carried out by conventional conditions. For example, at the temperature of 240 to 260° C., preferably at the temperature of less than 250° C. and in the presence of titanium based catalyst, (a) the first (initial) polycondensation reaction is carried out under a high-vacuum and high speed stirring condition, then (b) the reaction pressure is adjusted to an atmospheric pressure by charging the reactor with nitrogen, and the reaction is further carried out under the high speed stirring condition, and (c) finally, while maintaining the atmospheric pressure, the reaction is further carried out under the low speed stirring condition to produce a polyester resin. In the polycondensation reaction, the byproducts such as glycol can be removed by distillation. In the initial polycondensation reaction, the high-vacuum condition can be equal to or less than 100 mmHg, preferably equal to or less than 30 mmHg. Due to the high vacuum condition, the byproduct having a low boiling point can be effectively removed from the polycondensation reaction system. The polycondensation reaction is carried out in the presence of the wax to produce the polyester resin of the present invention. Preferably, the wax is added at the final stage of the polycondensation reaction. More preferably, the wax is added and mixed at 10 minutes to 1 hour before completion of the polycondensation reaction.

The glass transition temperature (Tg) of the polyester resin according to the present invention is preferably within the range of 55 to 75° C. When the Tg is less than 55° C., the pulverizing property and the storage stability of the produced toner may be deteriorated. When the Tg is more than 75° C., the low temperature fixing property of the toner may be deteriorated, and it may be difficult to obtain desirable toner image. The preferable softening temperature of the polyester resin is 120 to 200° C., and more preferably 140 to 180° C. When the softening temperature is less than 120° C., the Tg decreases and accordingly, the storage stability of the toner is deteriorated, so that toner particles may be cohered or aggregated during storage and the offset may be occurred at high temperature. When the softening temperature is more than 200° C., the low temperature fixing property of the toner is deteriorated, and the offset may be occurred. Also, the acid value of the polyester resin is preferably equal to or less than 30 KOHmg/g, and more preferably, 1 to 30 KOHmg/g, and most preferably, 1 to 20 KOHmg/g. When the acid value is more than 30 KOHmg/g, the storage stability of the polyester resin may be deteriorated during storage and/or delivery of the resin or in a developer of a printer. Preferably, the amount of gel in the polyester resin is 2 to 30 weight % with respect to the total polyester resin. When the amount of the gel is less than 2 weight %, the offset preventing property of the toner may be deteriorated. When the amount of the gel is more than 30 weight %, the low temperature fixing property of the toner may be deteriorated, and accordingly, it is difficult to obtain desirable toner image.

The polyester resin of the present invention can be used as a main component of a binder resin for a toner. If necessary, the polyester resin of the present invention can be used in combination with other conventional resins such as styrene resin or styreneacryl resin. The amount of the binder resin in the toner is preferably 30 to 95 weight %, and more preferably 35 to 90 weight %. When the amount of the binder resin is less than 30 weight %, the offset preventing property of the toner may be deteriorated, and when the amount of the binder resin is more than 95 weight %, the electrification stability of the toner may be deteriorated. The polyester resin of the present invention may be used with a coloring agent for a toner. Examples of the coloring agent or a pigment include carbon black, nigrosine dyes, lamp black, sudan black SM, naval yellow, mineral fast yellow, ritol red, permanent orange 4R, and so on. Also, the polyester resin of the present invention may be used with conventional additives for toner, such as conventional wax, electrification control agent, magnetic substances (for example, magnetic powder), and so on. Examples of the electrification control agent include nigrosine, azine-based dye containing alkyl group, basic dye, monoazo dye and its metal complex, salicylic acid and its metal complex, alkyl salicylic acid and its metal complex, naphthoic acid and its metal complex, and so on. Examples of the magnetic powder include ferrite, magnetite, and so on.

The toner including the polyester resin of the present invention may be prepared by conventional methods. For example, first, the polyester resin (a binder resin), a coloring agent, and other additives are mixed and kneaded with a uniaxial or biaxial extruder or a mixer at the temperature which is higher than the softening temperature of the binder resin by 15 to 30° C., and the kneaded mixture is pulverized to produce toner particles. The average particle size of the toner is generally 5 to 20 µm, and preferably 7 to 9 µm. Also, It is more preferable that the amount of the minute toner particles having the particle size of less than 5 µm is less than 3 weight % in the total toner.

The following examples and comparative examples are provided to illustrate the present invention in more detail, but the present invention is not restricted or limited by the following examples. In the following examples and comparative examples, the physical properties were measured as follows.

(1) Glass Transition Temperature, Tg (° C.): The glass transition temperature was measured with a differential scanning calorimeter (manufactured by TA Instruments) while quenching the melted sample and then increasing the sample temperature with the rate of 10° C./minute. The Tg was determined from the mid value of tangent lines of an endothermic curve and a base line.

(2) Softening Temperature (° C.): Softening temperature was determined with a flow tester (CFT-500D, manufactured by Shimadzu Laboratories), and is a temperature at the moment that the half of 1.5 g sample flows out from a 1.0Φ× 10 mm (height) nozzle under the conditions of 10 kgf of load, and temperature increase rate of 6° C./minute.

(3) Acid Value (KOHmg/g): Resin was dissolved with dichloromethane, cooled, and titrated with 0.1N KOH-methanol solution.

(4) Amount of Gel (weight %): The amount of gel represents the amount of the resin (weight %) which is not dissolved in tetrahydrofuran (THF) for the total resin (100 weight %). This test measures the cross-linking density of the polyester resin. Specifically, 0.1 g of the polyester resin (measured to 0.001 g accuracy) is added into 100 ml of THF, stirred and dissolved for 2 hours, and then settled down for 22 hours. The solution is filtered with 200 mesh stainless steel filter, and then the amount of the remaining resin was calculated by percentage.

(5) Storage Stability: 100 g of toner is put into a glass bottle and the bottle is sealed. After 48 hours at 50° C., the cohesion of the toner is observed by naked eyes. The cohesion degrees are evaluated as follows.

⊚: No cohesion and good storage stability
O: Minute cohesion but good storage stability
X: Serious cohesion and bad storage stability (6) Minimum Fixing Temperature and Offset Temperature: After coating a white paper with the produced toner, the paper is passed through a heat roller coated with silicon oil with a speed of 200 mm/second. The lowest temperature of the heat roller at which more than 90% of toner is fixed is defined as the minimum fixing temperature. The highest temperature of the heat roller at which more than 90% of toner was fixed is defined as the offset temperature. The minimum fixing temperature and the offset temperature are measured within the temperature range of 50 to 230° C. of the heat roller. The temperature range between the minimum fixing temperature and the offset temperature is defined as the fixing temperature range.

(7) Image Density of Toner: 100 images (copies) are printed on OHP films or papers with a black-and-white printer, which has a heat roller coated with Teflon and a temperature controller, and has a printing speed of 40 pages/minute. Then, the image flows and image densities (solid area) for the 100 printed images are measured with a Macbeth reflective densitometer RD918, and then the average values are evaluated as follows.

⊚: The image density is equal to or more than 1.4.
O: The image density is equal to or more than 1.2.
X: The image density is less than 1.2.

(8) Wax Dispersibility: Raw materials for the toner(resin, coloring agent, and other additives) are kneaded with a kneader, and the kneaded mixture is extruded in a form of a plate, and is solidified at room temperature. The cross section of the solidified toner is observed with SEM (scanning electron microscope), and then is evaluated as follows.

⊚: good wax dispersibility and wax particle diameter of equal to or less than 2 micron.

O: good wax dispersibility and wax particle diameter of more than 2 micron.

X: bad wax dispersibility and wax particle diameter of more than 2 micron.

(9) Amount of Wax: While increasing the temperature of the toner sample with a speed of 10° C./min, the area of a heat absorption peak due to the melting of the toner sample was measured with a differential scanning calorimeter (manufactured by TA Instruments). The measured peak area is compared with an area of a heat absorption peak due to a pure wax to obtain the amount of wax in the toner.

⊚: The amount of the wax remaining in the toner is more than 80 weight % with respect to the total added wax.

O: The amount of the wax remaining in the toner is more than 60 weight % with respect to the total added wax.

X: The amount of the wax remaining in the toner is more than 40 weight % with respect to the total added wax.

Examples 1-7 and Comparative Examples 1-9

A. Preparation of Polyester Resin 565 g of terephthalic acid, 80 g of dimethyl 1,4-cyclohexane dicarboxylate, 38 g of trimellitic acid anhydride, 164 g of ethyleneglycol, 330 g of 2,2-bis(4-hydroxyphenyl) propane propyleneoxide adduct, 138 g of 1,4-cyclohexane dimethanol, 22 g of glycerol, hydrogenated polybutadiene polyol were introduced into a 2 L reactor equipped with a stirring apparatus and a flow-out condenser. While slowly increasing the temperature of the reactor to 250° C. under nitrogen-flow atmosphere and flowing out water (byproduct) from the reactor, the esterification reaction was carried out. After completion of the generation and the flowing-out of water, the reactants were transferred to a polycondensation reactor equipped with a stirring apparatus, a cooling condenser, and a vacuum system. Then, $TiO_2/SiO_2$ co-precipitate of 200 ppm with respect to the total acid components was added. While increasing the temperature of the reactor to 250° C. and decreasing the pressure of the reactor to 50 mmHg during 30 minutes, the reaction was carried out at low vacuum state and excess diol was removed. Next, the pressure of the reactor was slowly decreased to 0.1 mmHg of high vacuum state, and the reaction was further carried out until a predetermined stirring torque was obtained. Wax was added to the reactor 10 minutes to 1 hour before the completion of the polycondensation reaction, and stirred and mixed. The Tg of the obtained polyester resin was 58 to 67° C., the softening temperature of the resin was 150 to 165° C., the acid value of the resin was 1 to 20 KOHmg/g, and the amount of the gel in the resin is 2 to 15 weight % with respect to the total polyester resin.

The kinds and the amounts of the polybutadiene polyol and the wax used in the above mentioned reaction are set forth in the following Table 1. In Table 1, the amounts of the polybutadiene polyol and the wax are based on the theoretical production amount the total polyester resin. In Table 1, HPBD represents Hydrogenated Polybutadiene Polyol, and HPBD A represents Hydrogenated Polybutadiene Polyol having the number average molecular weight of about 1,300 (hydroxyl value of 75 KOHmg/g), and the HPBD B represents Hydrogenated Polybutadiene Polyol having the number average molecular weight of about 1,800 to 2,500 (hydroxyl value of 40 to 55 KOHmg/g), and the HPBD C represents Hydrogenated Polybutadiene Polyol having the number average molecular weight of about 4,000 (hydroxyl value of 25 KOHmg/g). In Table 1, wax A to F represent polyethylene wax having the Tm (melting point) of 80° C., 88° C., 99° C., 107° C., 126° C., and 150° C., respectively, and the number with parenthesis "( )" represents that the wax was added not in the polymerization process of the resin but in the preparation process of toner.

B. Preparation of Toner 53 weight part of the produced polyester resin, 45 weight part of magnetite as a magnetic material and a coloring agent, and 2 weight part of azo-dye metal complex as an electrification control agent were mixed with a mixer, and melt-kneaded in an extruder. Next, the extruded mixture was finely pulverized with a Jet mill pulverizer, and the pulverized particles were classified with a wind-force classifier. Then, the particles were coated with 1 weight part of silica and 0.2 weight part of titanium dioxide to obtain toner particles having the volume average particle size of 8 to 9 μm. The wax dispersibility, storage stability, minimum fixing temperature, offset temperature, fixing temperature range, and toner image density of the produced toner were measured and set forth in Table 1.

TABLE 1

|  | Examples | | | | | | | Comparative Examples | | | | | | | | |
| --- | --- | --- | --- | --- | --- | --- | --- | --- | --- | --- | --- | --- | --- | --- | --- | --- |
|  | 1 | 2 | 3 | 4 | 5 | 6 | 7 | 1 | 2 | 3 | 4 | 5 | 6 | 7 | 8 | 9 |
| HPBD A (weight %) | — | — | — | — | — | — | — | — | — | 1.0 | — | — | — | — | — | — |
| HPBD B (weight %) | 0.1 | 2.0 | 0.7 | 1.0 | 0.5 | 0.5 | 0.7 | — | 3 | — | — | 0.7 | 1.0 | 0.5 | 1.0 | 0.7 |
| HPBD C (weight %) | — | — | — | — | — | — | — | — | — | — | 1.5 | — | — | — | — | — |
| Wax A (weight %) | — | — | — | — | 6 | — | — | — | — | — | — | — | — | — | — | — |
| Wax B (weight %) | — | — | — | — | — | 6 | — | — | — | — | — | — | — | — | — | — |
| Wax C (weight %) | 6 | 6 | 0.5 | 15 | — | — | — | 6 | 6 | — | — | 0.1 | 20 | (6) | — | — |
| Wax D (weight %) | — | — | — | — | — | — | 6 | — | — | — | — | — | — | — | — | — |
| Wax E (weight %) | — | — | — | — | — | — | — | — | — | — | — | — | — | — | 6 | — |

TABLE 1-continued

| | Examples | | | | | | | Comparative Examples | | | | | | | | |
|---|---|---|---|---|---|---|---|---|---|---|---|---|---|---|---|---|
| | 1 | 2 | 3 | 4 | 5 | 6 | 7 | 1 | 2 | 3 | 4 | 5 | 6 | 7 | 8 | 9 |
| Wax F (weight %) | — | — | — | — | — | — | — | — | — | — | — | — | — | — | — | 6 |
| Tg (° C.) | 67 | 58 | 65 | 64 | 66 | 66 | 66 | 68 | 53 | 64 | 55 | 65 | 63 | 67 | 64 | 65 |
| Wax Dispersibility | ○ | ◎ | ◎ | ○ | ◎ | ◎ | ◎ | ○ | ◎ | X | ◎ | ◎ | X | X | ◎ | ◎ |
| Amount of wax | ○ | ◎ | ◎ | ○ | ◎ | ◎ | ◎ | X | ◎ | ○ | ◎ | ◎ | X | ○ | ◎ | ◎ |
| Pulverizing property | ◎ | ○ | ◎ | ◎ | ◎ | ◎ | ◎ | ◎ | X | ◎ | X | ◎ | ○ | ◎ | ◎ | ◎ |
| Storage stability | ◎ | ○ | ◎ | ○ | ◎ | ◎ | ◎ | ◎ | X | ◎ | X | ◎ | X | ◎ | ◎ | ◎ |
| Minimum fixing temperature (° C.) | 145 | 130 | 145 | 150 | 140 | 145 | 160 | 165 | 120 | 150 | 140 | 145 | 160 | 155 | 150 | 155 |
| Offset temperature (° C.) | 195 | 200 | 190 | 210 | 200 | 200 | 210 | 190 | 185 | 190 | 195 | 170 | 210 | 195 | 185 | 185 |
| Fixing temperature range (° C.) | 50 | 70 | 45 | 60 | 60 | 55 | 50 | 35 | 65 | 40 | 55 | 25 | 50 | 40 | 35 | 30 |
| Image density, 100 copies | ◎ | ◎ | ◎ | ◎ | ◎ | ◎ | ◎ | ○ | ◎ | ○ | ○ | X | X | ○ | ○ | ○ |
| Image density, 2000 copies | ◎ | ◎ | ◎ | ◎ | ◎ | ◎ | ◎ | ○ | ○ | ○ | X | X | X | ○ | ○ | ○ |
| Image density, 5000 copies | ◎ | ○ | ◎ | ○ | ◎ | ◎ | ◎ | X | X | ○ | X | X | X | ○ | ○ | ○ |

As shown Table 1, in Examples 1 to 7, in which the amount of the HPBD having the number average molecular weight of about 1,800 to 2,500 (hydroxyl value of 40 to 55 KOHmg/g) is 0.1 to 2 weight %, and the amount of the wax was 0.5 to 15 weight % with respect to the total resin, the wax dispersibility, the pulverizing property, the storage stability, the fixing temperature ranges, and the image for long-term use are desirable. On the contrary, in Comparative Examples 1 to 3, in which the HPBD (wax compatibilizer) is not used, or the HPBD having the number average molecular weight of about 1,300 (hydroxyl value of 75 KOHmg/g) is used, the dispersibility of the wax and the image to the toner are not desirable. In Comparative Examples 2 to 4, in which the excessive amount of the HPBD is used, or the HPBD having the number average molecular weight of about 4,000 (hydroxyl value of 25 KOHmg/g) is used, the Tg of the resin decreases, and accordingly, the wax dispersibility and the storage stability were deteriorated. In Comparative Example 5, in which the amount of the wax is too small, the toner image and the fixing temperature ranges are not desirable. In Comparative Example 6, in which the excessive amount of the wax is used, the wax dispersibility and the storage stability are deteriorated, and accordingly, the toner image is not desirable. In Comparative Example 7, in which the wax was added in the preparation process of the toner not in the polymerization process of the resin, the wax dispersibility is deteriorated, and accordingly, the toner image and the fixing ranges are not desirable. In Comparative Examples 8 to 9, in which the wax having the high melting point is used, due to the high melting temperature of the wax, the releasing and melting properties of the resin are deteriorated, and accordingly, the fixing temperature ranges and the image density are deteriorated.

INDUSTRIAL APPLICABILITY

The toner of the present invention has desirable characteristics in storage stability, fixing temperature range, image density, and so on.

The invention claimed is:

1. A polyester resin comprising:
    acid components including aromatic dibasic acid component and trivalent or higher acid component;
    alcohol components including aliphatic, aromatic or cycloaliphatic diol component, and trihydric or higher alcohol component;
    polyolefin polyol having 1,800 to 2,500 number average molecular weight and hydroxyl value of 40 to 55 KOHmg/g; and
    wax having melting point of 80 to 110,
    wherein the amount of the polyolefin polyol is 0.1 to 2 weight % and the amount of the wax is 0.5 to 15 weight % with respect to the total polyester resin.

2. The polyester resin according to claim 1, wherein the polyolefin polyol is hydrogenated polybutadiene polyol.

3. The polyester resin according to claim 1, wherein the wax is selected from the group consisting of polyolefin wax, carnauba wax, montan ester wax, bees wax and rice wax.

4. The polyester resin according to claim 1, wherein the wax is dispersed to have the diameter of equal to or less than 2 in the polyester resin.

5. A method for preparing a polyester resin comprising the steps of:
    (a) carrying out an esterification reaction or an ester exchange reaction with acid components aromatic dibasic acid component and trivalent or higher id component; alcohol components including aliphatic, aromatic or cycloaliphatic diol component, and trihydric or higher alcohol component; and polyolefin polyol having 1,800 to 2,500 number average molecular weight and hydroxyl value of 40 to 55 KOHmg/g; and
    (b) carrying out a poly condensation reaction for reaction product of the esterification or ester exchange reaction in the presence of wax having melting point of 80 to 110.

6. A toner comprising the polyester resin according to claim 1.

* * * * *

UNITED STATES PATENT AND TRADEMARK OFFICE
CERTIFICATE OF CORRECTION

PATENT NO. : 8,133,650 B2
APPLICATION NO. : 12/743543
DATED : March 13, 2012
INVENTOR(S) : Young-Man Yoo et al.

It is certified that error appears in the above-identified patent and that said Letters Patent is hereby corrected as shown below:

In the Claims, Column 12, Claim 5, line 54, please delete "components aromatic" and insert --components including aromatic--.

In the Claims, Column 12, Claim 5, line 55, please delete "id" and insert --acid--.

In the Claims, Column 12, Claim 5, line 61, please delete "poly condensation" and insert --polycondensation--.

Signed and Sealed this
Fourth Day of September, 2012

David J. Kappos
*Director of the United States Patent and Trademark Office*